(12) United States Patent
Lee

(10) Patent No.: US 12,301,091 B2
(45) Date of Patent: May 13, 2025

(54) ARTIFICIAL DUAL CLOSED-LOOP FULL-TIME INDUCTOR CURRENT SENSING

(71) Applicant: Alpha and Omega Semiconductor International LP, Toronto (CA)

(72) Inventor: Gilbert S. Z. Lee, Seongnam-si (KR)

(73) Assignee: ALPHA AND OMEGA SEMICONDUCTOR INTERNATIONAL LP, Toronto (CA)

( * ) Notice: Subject to any disclaimer, the term of this patent is extended or adjusted under 35 U.S.C. 154(b) by 326 days.

(21) Appl. No.: 17/992,249

(22) Filed: Nov. 22, 2022

(65) Prior Publication Data

US 2024/0168065 A1    May 23, 2024

(51) Int. Cl.
H02M 3/158        (2006.01)
H02M 1/00         (2006.01)

(52) U.S. Cl.
CPC ......... *H02M 1/0009* (2021.05); *H02M 3/158* (2013.01)

(58) Field of Classification Search
CPC ..... H02M 1/0009; H02M 3/158; H02M 3/156
See application file for complete search history.

(56) References Cited

U.S. PATENT DOCUMENTS

| 6,333,728  | B1  | 12/2001 | Libsch et al. |
|---|---|---|---|
| 7,068,022  | B2  | 6/2006  | Balakrishnan |
| 8,098,059  | B2  | 1/2012  | Nakahashi et al. |
| 8,593,126  | B2  | 11/2013 | Suga et al. |
| 9,106,075  | B2  | 8/2015  | Tomas et al. |
| 9,491,014  | B1  | 11/2016 | Lee |
| 9,612,604  | B2  | 4/2017  | Hayashi |
| 9,853,548  | B1  | 12/2017 | Zhang |
| 10,063,146 | B1  | 8/2018  | Lee |
| 2005/0237042 | A1 | 10/2005 | Yoshida et al. |
| 2012/0139518 | A1 | 6/2012  | Cleveland et al. |
| 2012/0153915 | A1* | 6/2012 | Loikkanen ............. G05F 1/618 323/283 |
| 2012/0235652 | A1 | 9/2012  | Sheng et al. |
| 2013/0293204 | A1 | 11/2013 | Lu |
| 2015/0255930 | A1 | 9/2015  | Lee |
| 2016/0049876 | A1 | 2/2016  | Lee et al. |
| 2016/0109488 | A1 | 4/2016  | Dearborn et al. |
| 2016/0259390 | A1 | 9/2016  | Tomas et al. |
| 2016/0344293 | A1 | 11/2016 | Hari et al. |

(Continued)

FOREIGN PATENT DOCUMENTS

CN    101604912 A    12/2009
CN    101621250 B    10/2013

(Continued)

*Primary Examiner* — Alex Torres-Rivera
(74) *Attorney, Agent, or Firm* — JDI PATENT; Joshua D. Isenberg

(57) ABSTRACT

A device, system, and method for inductor current sensing in a Switch Mode Power Supply (SMPS) are described. An input node signal indicating a voltage level at a switch node is sampled at a first time point and a second time point. An artificial ramp signal is generated and adjusted based on the first sampled node voltage and the second sampled node voltage to generate an output ramp signal having a triangular wave form with a rising slope proportional to the rising slope of the inductor current and a falling slope proportional to the falling slope of the inductor current.

21 Claims, 9 Drawing Sheets

(56) References Cited

U.S. PATENT DOCUMENTS

| | | | |
|---|---|---|---|
| 2019/0036453 A1* | 1/2019 | Masuch | H02M 1/08 |
| 2020/0328681 A1 | 10/2020 | Ou et al. | |
| 2021/0194369 A1* | 6/2021 | Kim | H02M 3/1582 |

FOREIGN PATENT DOCUMENTS

| | | |
|---|---|---|
| CN | 103378726 B | 8/2015 |
| CN | 105305817 B | 7/2018 |
| CN | 109104078 A | 12/2018 |
| CN | 113162402 A | 7/2021 |
| DE | 102007028568 | 12/2009 |
| JP | 5902401 B2 | 4/2016 |
| TW | I407668 B | 9/2013 |
| TW | I509967 B | 11/2015 |
| TW | I559665 B | 11/2016 |
| TW | I569569 B | 2/2017 |
| TW | M542295 U | 5/2017 |
| TW | I740717 B | 9/2021 |

\* cited by examiner

ARTIFICIAL DUAL CLOSED-LOOP FULL-TIME INDUCTOR CURRENT SENSING

FIELD OF THE DISCLOSURE

Aspects of the present disclosure relate to integrated circuits and more specifically current sensing devices in a Switch Mode Power Supply (SMPS)

BACKGROUND OF THE DISCLOSURE

Integrated circuits, such as microprocessors and memory devices, include many metal-oxide-semiconductor field-effect transistors (MOSFETs), which provide the basic switching functions to implement logic gates, data storage, power switching, and the like. In applications, MOSFETs have been widely employed in Switching Mode Power Supplies (SMPS) because they are power efficient and thermally efficient. In addition to MOSFET switches, a SMPS also comprises energy saving devices, such as inductors or capacitors.

A power supply is a key element in any electronic device and its performance can affect power efficiency, product safety and product performance. Thus, it is necessary for a power supply (e.g., an SMPS) to include a power monitoring system to monitor and/or regulate its output. Power regulation usually includes output voltage or current feedback. Since many SMPS systems (e.g., SMPS including power monitoring or regulation features) use current mode regulation, it is a critical for such systems to obtain accurate current information.

Recent computing applications demand SMPS systems to run at higher frequency to increase bandwidth. These applications also require SMPS systems to have a smaller form factor and reduced cost. SMPS systems manufacturers have responded to these requirements by using small inductors and capacitors. In addition, there is a trend to lower the operating voltage for SMPS systems (e.g., step-down DC-DC converters) to achieve higher speed operation and better power savings. As such, the voltage ratio ($V_{IN}/V_{OUT}$) between the input voltage and output voltage increases and the energy saving period (i.e., on-time duty cycle D) becomes shorter. Previous implementations simulated the falling slope of the current from the inductor but were susceptible to non-linear switching noise due to the construction of the power monitoring system. Additionally, these previous implementations did not have feedback loops, so output errors would sometimes propagate with no way to correct the errors, once introduced.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Figure 1:
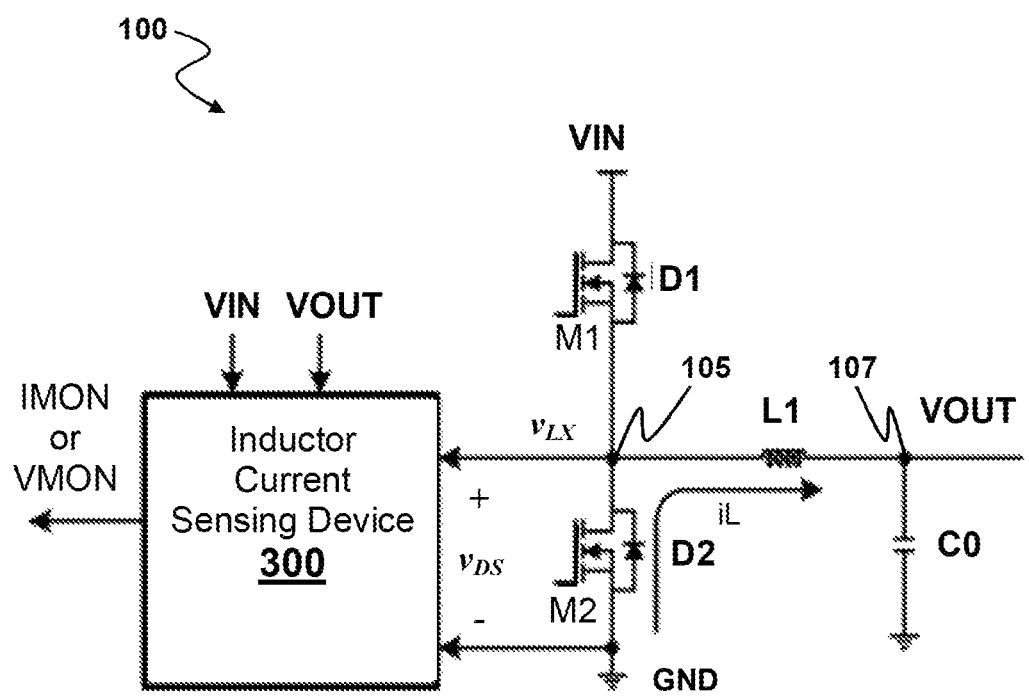
FIG. 1 shows an overview of a SMPS system with an inductor current sensing device according to aspects of the present disclosure.

FIG. 1 shows an overview of a SMPS system with an inductor current sensing device. In this implementation, the SMPS system 100 includes a step-down DC-DC converter and an inductor current sensing device 300 coupled to the converter. In other embodiments, the power supply in the SMPS system 100 may be a step-up DC-DC converter, a step-down and step-up DC-DC converter or any other SMPS. The DC-DC converter in the SMPS system of FIG. 1 includes power switching elements (M1-D1, M2-D2) coupled in series across the input voltage source. A first power switching element (M1-D1) is coupled to the voltage supply ($V_{IN}$) and a second power switching element (M2-D2) is connected to ground (GND). The first power switching element (M1-D1) is also referred to as the high-side (HS) switch and the second power switching element (M2-D2) as the low-side (LS) switch. An output filter including an inductor (L1) and a capacitor (C0) is connected to a junction 105 (e.g., phase node or switch node) formed by the pair of the HS and LS switches to provide an output voltage ($V_{OUT}$) to a load. The output voltage $V_{OUT}$ is buffered on the capacitor C0. A load (not shown) may be coupled to output node 107, and a current $i_L$ can be supplied through the inductor L1 to the load.

The HS and LS switches are controlled by a Pulse Width Modulation (PWM) signal generated from a controller (not shown). In one embodiment, the HS switch is controlled by a PWM signal, and the LS switch is controlled by a complementary pattern of the PWM signal or a NOT signal of the PWM signal. Thus, when the PWM signal is in a first logic state (e.g., a HIGH logic signal) and the NOT signal of the PWM signal is LOW, the HS switch is turned on (i.e., MOSFET M1 is turned on) and the LS switch is turned off (i.e., MOSFET M2 is turned off). At this time, current flows from the input node through HS switch to the inductor L1. An inductor current $i_L$ which flows through inductor L1 equals a HS current his which flows through the HS switch. When the PWM signal is in a second logic state (e.g., in logic LOW), NOT signal of the PWM signal is in logic HIGH, the HS switch is turned off (i.e., MOSFET M1 is turned off) and the LS switch is turned on (i.e., MOSFET M2 is turned on). As shown in FIG. 1, current flows from ground through the LS switch to the inductor L1. During this period, inductor current $i_L$ equals the LS current $i_{LS}$ which flows through the LS switch (M2 or D2). While it is possible, it is very difficult to sense HS current information due to the short turn-on time of the HS switch. Aspects of the present disclosure describe a method of sensing inductor current by sensing only the information of the LS switch. As such, when the HS switch is on and the LS switch is off, the HS current information that equals to the inductor current can be generated or emulated based on the sensed information of the LS switch. When the HS switch is off and the LS switch is on, the inductor current is the sensed current information of the LS switch.

In order to sense the LS current information (i.e., the source-to-drain current of the MOSFET M2), the drain-to-source voltage $v_{DS}$ and the turn-on resistance $R_{DS\_ON}$ of the MOSFET M2 are first acquired. The -drain-to-source voltage $v_{DS}$ of the MOSFET M2 equals the dropout voltage by the inductor current L. Therefore, the drain-to-source voltage $v_{DS}$ includes current information of the inductor L1. As shown in FIG. 1, the inductor current sensing device 300 is coupled across the source and drain of the LS switch to receive the drain-to-source voltage $v_{DS}$ as one of the inputs to the sensing device 300. In one embodiment, the drain-to-source voltage vim can be obtained from the voltage $v_{LX}$ at junction 105 because voltage $v_{DS}$ equals the difference between voltage $v_{LX}$ and ground GND. In addition, information of the input and output voltages ($V_{IN}$ and $V_{OUT}$) are also supplied to the sensing device 300. In one embodiment, information of the output voltage $V_{OUT}$ can be replaced with the filtered (or averaged) voltage $v_{LX}$ because the filtered voltage $v_{LX}$ is almost the same as the output voltage $V_{OUT}$.

Figure 2:
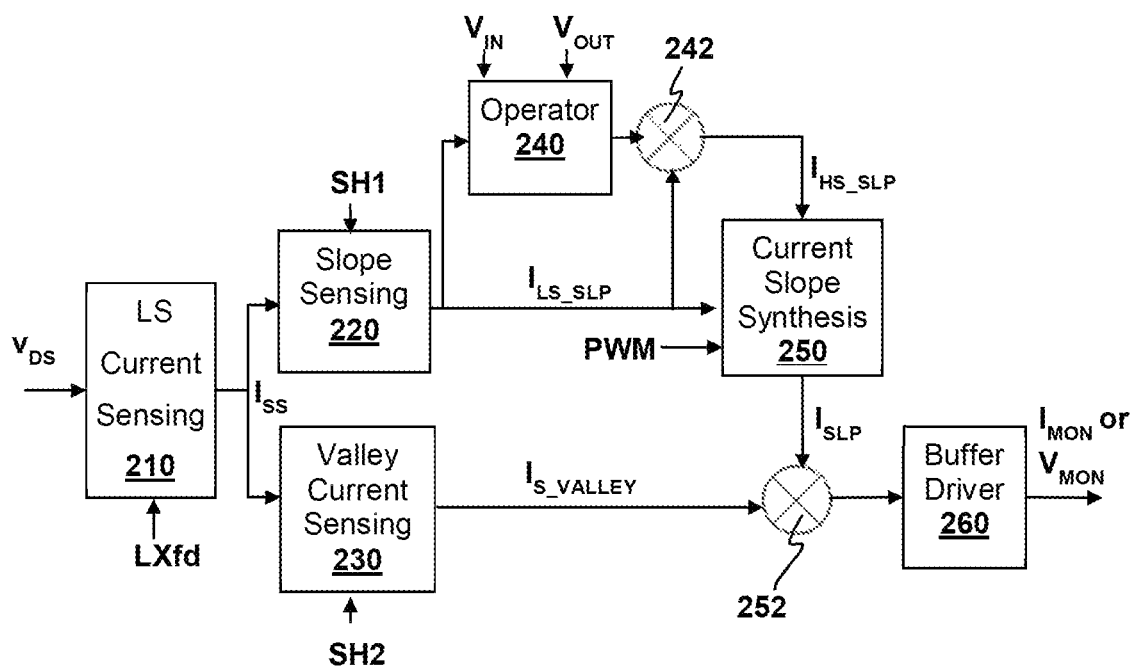
FIG. 2 depicts an implementation of a prior art inductor current sensing using the low side switch Rdson.

An example of a prior art implementation for LS switch inductor current sensing is shown in FIG. 2. The prior art sensing device includes a LS current sensing circuit 210, a slope sensing circuit 220, a valley current sensing circuit 230, an operator circuit 240, a current slope synthesis circuit 250, and a buffer driver 260. The LS current sensing circuit 210 receives the drain-to-source voltage $v_{DS}$ from the LS switch and converts it into a signal $I_{SS}$. The signal $I_{SS}$ includes information of the current slope (e.g., derived from $\Delta v_{DS}/\Delta t$) and the minimum (valley) current value within a triangular waveform in a cycle (e.g., deriving from the minimum voltage of the drain-to-source voltage $v_{DS}$). Next, the signal $I_{SS}$ from the LS current sensing circuit 210 is supplied to the slope sensing circuit 220 and the valley current sensing circuit 230.

In the slope sensing circuit 220, the current slope information in the signal $I_{SS}$ is converted into a constant current slope information. The valley current sensing circuit 230 converts the minimum current value in the signal $I_{SS}$ into the valley current information. The operator circuit 240 receives the LS current slope information $I_{LS\_SLP}$ from the slope sensing circuit 220, the input voltage $V_{IN}$ and output voltage $V_{OUT}$ as inputs. Based on these inputs, the operator circuit 240 is configured to calculate the HS current slope information according to the relationship between the HS current slope and LS current slope. The HS current slope information $I_{HS\_SLP}$ is obtained by multiplying the LS current slope information $I_{HS\_SLP}$ with ($V_{IN}/V_{OUT}$) and then subtracting the LS current slope information $I_{LS\_SLP}$. A subtractor circuit 242, separated from the operator circuit 240, is configured to subtract the LS current slope information $I_{LS\_SLP}$ from the output of the operator circuit 240 and output the result as the HS current slope information $I_{HS\_SLP}$. Once the LS current slope information $I_{LS\_SLP}$ and the HS current slope information $I_{HS\_SLP}$ are acquired, the current slope synthesis circuit 250 integrates the information according to the PWM signal and generates a synthesis signal $I_{SLP}$. The synthesis signal $I_{SLP}$ is a triangular waveform including a rising slope when the PWM signal is in HIGH state and a falling slope when the PWM signal is in LOW state. The rising slope is based on the HS current slope information $I_{HS\_SLP}$ and the falling slope is based on the LS current slope information $I_{LS\_SLP}$. The rising and failing slopes of the synthesis signal $I_{SLP}$ are proportional to the rising and falling slopes of the inductor current $I_L$.

A summation circuit 252 combines the synthesis signal $I_{SLP}$ from the current slope synthesis circuit 250 and the valley current information $I_{S\_VALLEY}$ from the valley current sensing circuit 230 and generates a combined signal. The combined signal is then provided to the buffer driver 260, which outputs a monitored current signal $I_{MON}$ or, alternatively, a monitored voltage signal $V_{MON}$.

There are several problems with this approach as briefly discussed previously. Firstly, the prior art device of FIG. 2 is sensitive to non-linear switching noise that occurs during the mathematical differentiation of the falling slope at 220 as well as multiplying and dividing performed by the operator circuit 240. Secondly the operator 240 relies on operation of MOSFETs in the deep triode region which is typically quite a narrow window of operation for $v_{DS}$, this limits the operating ranges for $V_{IN}$, $V_{OUT}$, and $I_{OUT}$. Additionally, large slope variation by switching frequency and variable inductor variation may cause errors with the operator 240. Finally, the prior art implementation is an open-loop system that has no built-in feedback loop to correct for errors thus errors may propagate or even compound as the prior implemented device runs. Moreover, the prior art needs $V_{IN}$ and $V_{OUT}$ information to calculate $I_{HS\_SLP}$ with $I_{LS\_SLP}$ in the operator 240.

Basic Function Device/Method

According to aspects of the present disclosure, an SMPS system may use a dual closed loop to generate an artificial triangular ramp signal with a programed target gain from the triangular inductor current signal. A first loop regulates the rising slope of the artificial triangular ramp related to the rising slope of the inductor current signal and a second loop regulates the falling slope of the artificial triangular ramp related to the falling slope of the inductor current signal. The first loop samples two input signals at a first time point and the second loop samples two input signals at a second time point. At the first and second time points an input signal is sampled and held from a sensed saw-tooth waveform inductor current signal and another signal is sampled and held from the artificial triangular ramp signal. The sampled signal from the triangular inductor current signal at the second time point is used as the valley information of the artificial triangular ramp signal and the artificial triangular ramp signal sits on the sampled valley signal from the triangular inductor current from the previous cycle.

The two closed loops do not operate at once to avoid an unstable operation in general. If one of the closed loops finishes its regulation the other one starts regulating, not in parallel, but in series and this operation continues for both loops until they meet their respective target resolutions. Further details of operation of the dual closed loops may be understood with respect to the discussions of FIG. 3, FIG. 4, FIG. 5, FIG. 6, FIG. 7, FIG. 8, and FIG. 9 below. Of course, the two closed loops may be regulated in parallel at once to reduce settling time according to application operating range.

Figure 3:
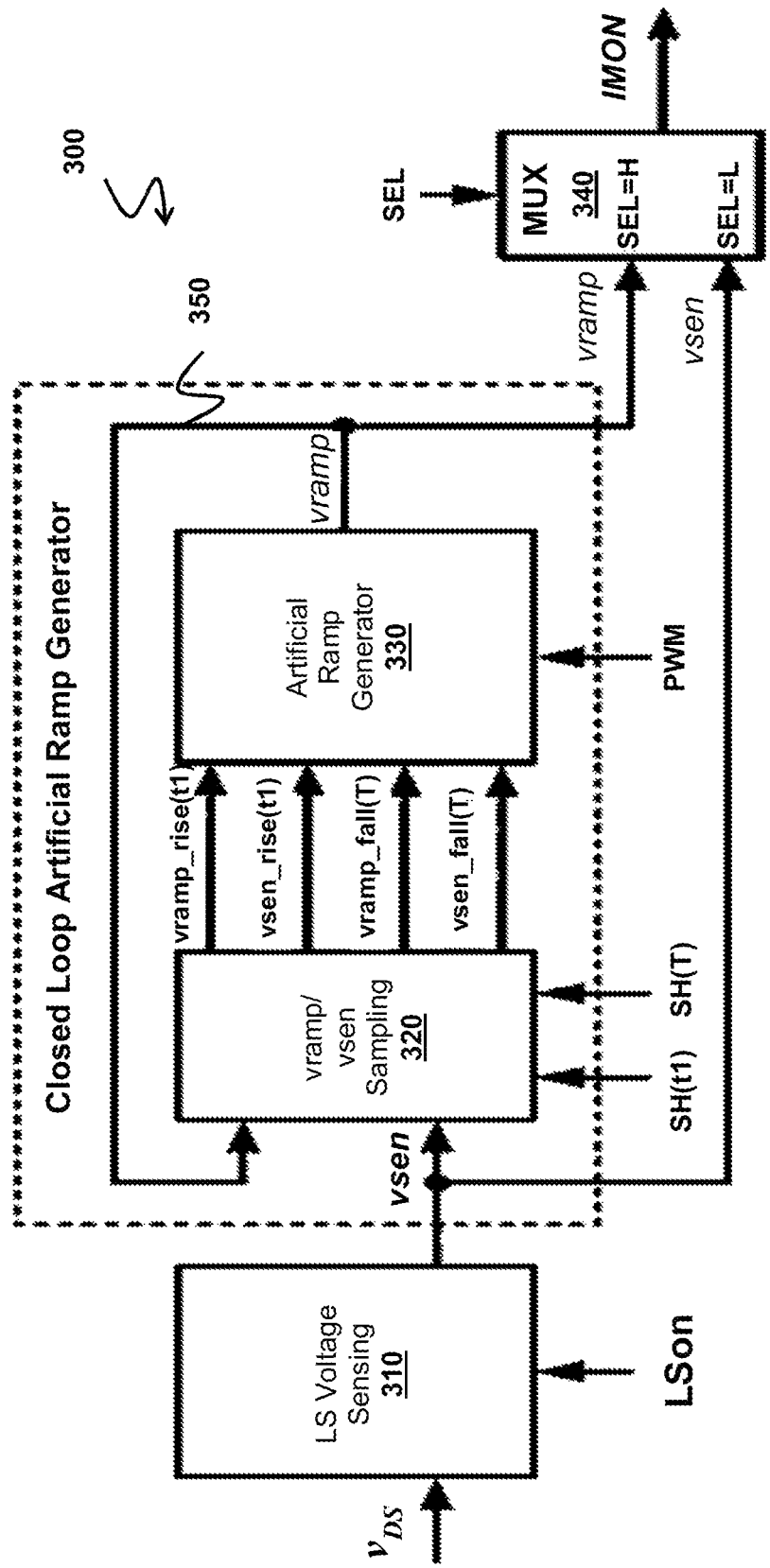
FIG. 3 shows a block diagram of the improved inductor current sensing device according to aspects of the present disclosure.

FIG. 3 shows a block diagram of the improved inductor current sensing device according to aspects of the present disclosure. The sensing device 300 includes a LS voltage sensing circuit 310, Artificial ramp generator 330, vramp/vsen sampling circuit 320, and Multiplexer 340. The LS voltage sensing 310 circuit receives the drain-to-source voltage $v_{DS}$ from the LS switch and compensates for variations in the voltage signal due to operating conditions. For example and without limitation, the LS voltage sensing circuit 310 may compensate for Temperature, or gate operating voltage ($V_{gs}$). The LS voltage sensing circuit 310 outputs a compensated voltage vsen to a vramp/vsen sampling circuit 320 and a multiplexer 340. The vramp/vsen sampling circuit 320 samples the voltage level of vsen at a first time point, t1. The first time point may be for example and without limitation the end of the inductor current rising period or the beginning of the inductor current falling period. The vramp/vsen sampling circuit 320 samples the voltage level of vsen at a second time point T. The second time point may be for example and without limitation the end of the inductor current falling period. The vramp/vsen sampling circuit 320 also receives and samples the voltage level of an artificial ramp signal vramp at the first time point t1 and at the second time point T. The vramp/vsen sampling circuit 320 outputs the sampled node voltage level at the first time point (also referred to as "the first sampled node voltage") vsen_rise(t1), the sampled node voltage level at the second time point (also referred to as "the second sampled node voltage") vsen_fall(T), the sample artificial ramp signal level at the first time point (also referred to as "the first sampled ramp signal") vramp_rise(t1), and the sampled artificial ramp signal level at the second time point (also referred to as "the second sampled ramp signal level") vramp_fall(T).

The artificial ramp signal generator 330 is configured to receive the signals vsen_rise(t1), vsen_fall(T), vramp_rise (t1), vramp_fall(T) and a pulse width modulated signal PWM. The artificial ramp signal generator 330 generates a saw tooth signal, the artificial ramp signal, vramp and uses the input signals regulate the vramp signal such that that it becomes proportional to the inductor current. The artificial ramp generator regulates vramp to match a saw tooth input signal at two sampling points t1 and T. The vramp signal is output to the multiplexer 340 and fed back to the vramp/vsen sampling circuit 320. It should be noted that the vramp signal operates as a feedback loop such that the sampled vramp signal is one cycle behind the artificial ramp signal output by the artificial ramp signal generator 330 where a cycle is a triangular signal having a rising section and a falling section controlled by the PWM. According to aspects of a present disclosure a cycle may be generated using samples at two time points t1 and T. For example and without limitation, the artificial ramp signal, of cycle n (vramp(n)) and sensed node voltage at cycle n (vsen(n)) may be sampled at times t1 and T and the samples taken at t1 and T may be used to generate the artificial ramp signal of cycle n+1 (vramp(n+1)). The artificial ramp signal generator 330 may further be configured to adjust the artificial ramp signal based on sampled signals from the previous cycle. The artificial ramp signal generated may be configured to reduce a difference between the ramp signal and sensed node voltage signal between cycles. For example and without limitation, the artificial ramp generator may be configured to adjust the output ramp signal such that vramp(n)−vsen(n) is greater than or equal to vramp(n+1)−vsen(n+1) where vsen (n+1) is the sensed node voltage signal of the next cycle.

The multiplexer 340 receives as input the vramp, vsen and a selection signal SEL. The multiplexer 340 selects between vramp and vsen based on SEL and outputs the selected signal. The selection signal may be used to switch between a real current sensing setting (outputting vsen) and an artificial ramp signal setting (outputting vramp) of the inductor current sensing device. Thus, based on SEL the Multiplexer 340 output, IMON is a signal corresponding to vramp or vsen.

Figure 4:
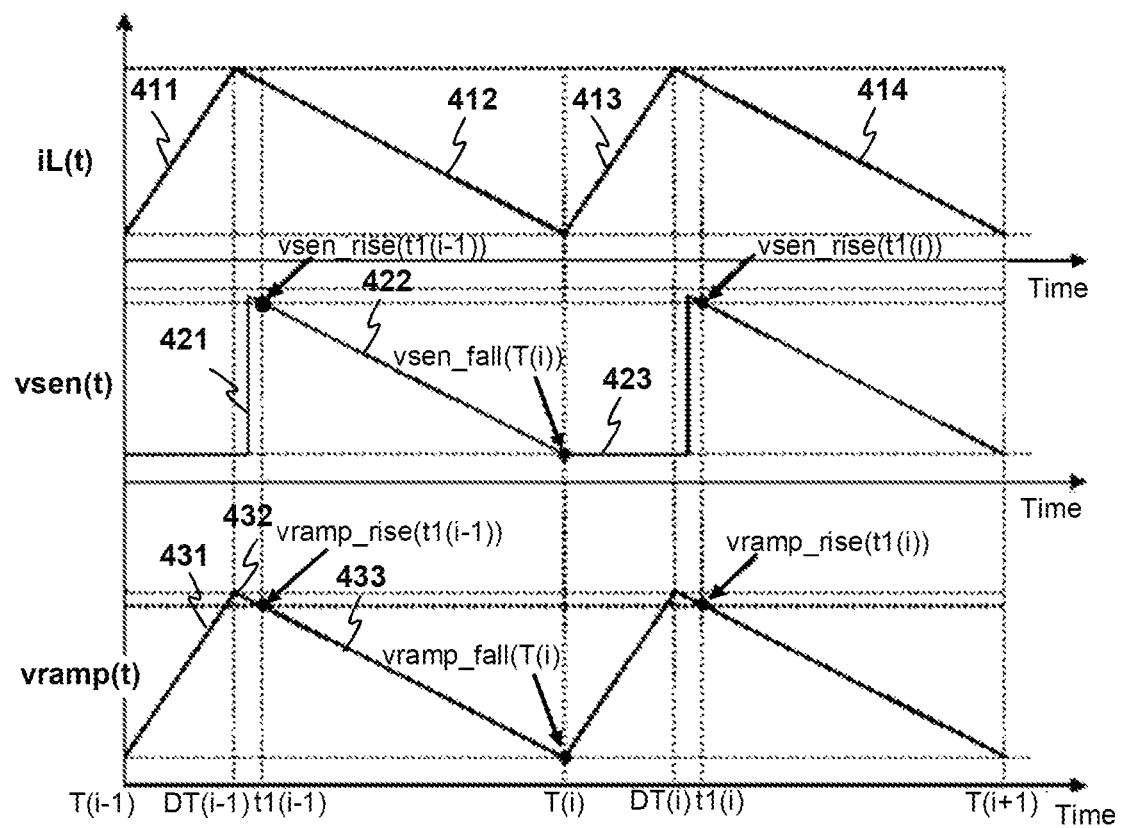
FIG. 4 is a graph depicting inductor current, sensed node voltage inputs to an inductor current sensing device, and an output artificial ramp signal according to aspects of the present disclosure.

Operation of the current sensing device depicted in FIG. 3 may be understood by referring to FIG. 4. The graph shown in FIG. 4 depicts the inductor current, sensed node voltage inputs to the inductor current sensing device, and the output artificial ramp signal. As shown the inductor current curve iL starts at time T(i−1) and includes a rising portion 411 which peaks at time DT(i−1) and falling portion 412 which hits a low at time T(i). Here two cycles (from the rise of cycle (i−1) to the low of cycle (i+1)) are shown where the first rising portion 411 and first falling portion 412 corresponds to a first cycle starting at T(i−1) and peaking at DT(i−1) and the second rising portion 413 and second falling portion 414 corresponds to the second cycle starting at T(i) and peaking at DT(i). The signal corresponding to sensed node voltage vsen(t) shows a vertical jump 421 after the current rising portion 411 peaks and the falling slope of the of vsen(t), 422 matches the falling slope of iL(t). The sensed node voltage vsen(t) is sampled near the peak at a first time point t1(i−1) generating the sampled signal vsen_ rise(t1(i−1)) and at a second time point T(i) to generate sampled signal vsen_fall(T(i)). The signal level of vsen_rise (t1(i−1)) is greater than vsen_fall(T(i)) and vsen_fall(T(i)) may correspond to the lowest current through the inductor and the point at which the high side switch is turned on and the low side switch is turned off. As shown, vsen(t) lacks information regarding the charging state 423 of the current through the inductor while the high side switch is charging the inductor. The inductor current sensing device 300 is configured to artificially generate the current information through the inductor while the high side switch is in the "on" state. After a training period the artificial ramp signal vramp(t) replicates the inductor current iL(t) using information from vsen(t). As shown vramp(t) has a rise portion 431 that rises linearly to a peak 432 at DT(i−1) before vsen_rise (t1(i−1)), which corresponds to the peak current through the inductor before switching the high side switch to the off state. The slope of vramp(t) conforms to the slope between vsen_rise(t1(i−1)) and vsen_fall(T(i)) such that vramp_rise (t1(i−1))=vsen_rise(t1(i−1)) and vramp_fall(T(i))=vsen_fall (T(i)). It can also be seen that vsen_fall(T(i)) marks the beginning of rise period for vramp(t) corresponding to the point at which the high side switch is turned "on," and the inductor begins to rise. The signal vramp(t) uses feedback from previous cycles to improve correspondence of the signal with vsen(t). For example and without limitation, a sample of the signal level vramp(t) at vramp_rise(t1(i−1)) may be compared with vsen_rise(t1(i−1)) and the signal level at vramp_rise(t1(i)) may be adjusted as a result of the comparison. Similarly, the signal level at vramp_fall(T(i)) may be compared to vsen_fall(T(i)) and vramp_fall(T(i+1)) (not shown) may be adjusted.

Figure 5:
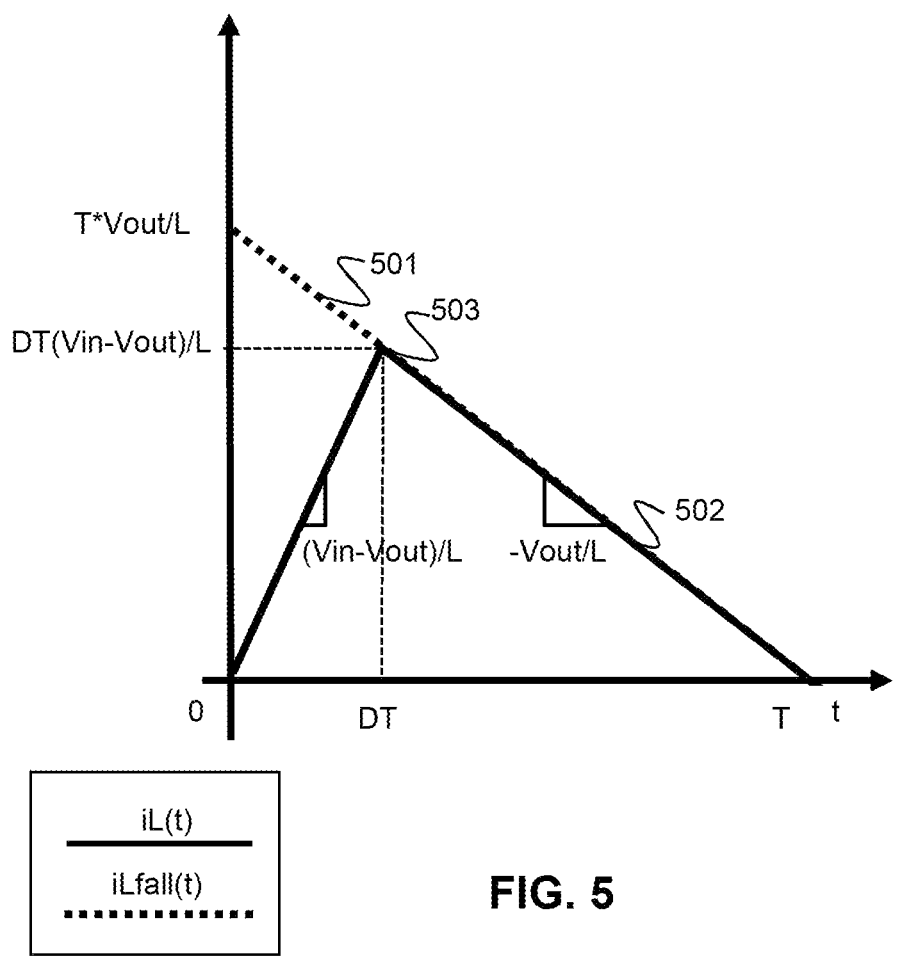
FIG. 5 is a line graph depicting the inductor current curve and a regression curve of the sensed voltage across the low side switch according to aspects of the present disclosure.

FIG. 5 is a line graph depicting the inductor current function of a triangular waveform and a regression line function of the sensed voltage across the low side switch according to aspects of the present disclosure. The regression curve $iL_{fall}(t)$ to the time point of t=0 of the current sensed across the low side switch 501 may be described by Eq. 1:

$$iL_{fall}(t) = -\frac{Vout}{L} * t + \frac{Vout * T}{L} \qquad \text{Eq. 1}$$

The true curve 502 of the current through the inductor iL(t) may be described by Eq. 2:

$$iL(t) = \left|\frac{Vin}{2*L} * t - \frac{Vout*T}{2*L}\right| + \frac{Vin - 2*Vout}{2*L} * t + \frac{Vout*T}{2L} \qquad \text{Eq. 2}$$

In Eq. 1 and Eq. 2 Vout is the voltage output voltage of the power converter, L is the inductance of the inductor and Vin is voltage supply input to the power converter. The inductor current iL(t) has a triangular shape that starts at the origin t=0 and rises with the slope vin-vout/L inflecting at time DT with the slope −vout/L finishing to the starting current value at time T. The line $iL_{fall}$ has a negative linear slope starting at point (0, T*vout/L) and falling to (T,0) with a slope −vout/L. Thus, starting at time point DT, the lines $iL_{fall}(t)$ and iL(t) overlap.

From the overlay, it can be seen that $iL_{fall}(t)$ and iL(t) overlap from starting from point 503 at time DT to time T. Since these two lines having different linear equations meet at more than two points it can be said that they have a congruence relation with each other for times DT≤t≤T. As such $iL_{fall}(t)$ maybe used to accurately reconstruct iL(t) back to time DT. This is useful because switching noise (such as ring back) causes inaccurate measurements at DT and a separate time point close to DT but after the switching noise has diminished or been eliminated may be chosen for signal level measurement. The voltage level at DT may then be calculated using Eq. 1.

Matching the Inductor Current with an Artificial Ramp Circuit

Figure 6A:
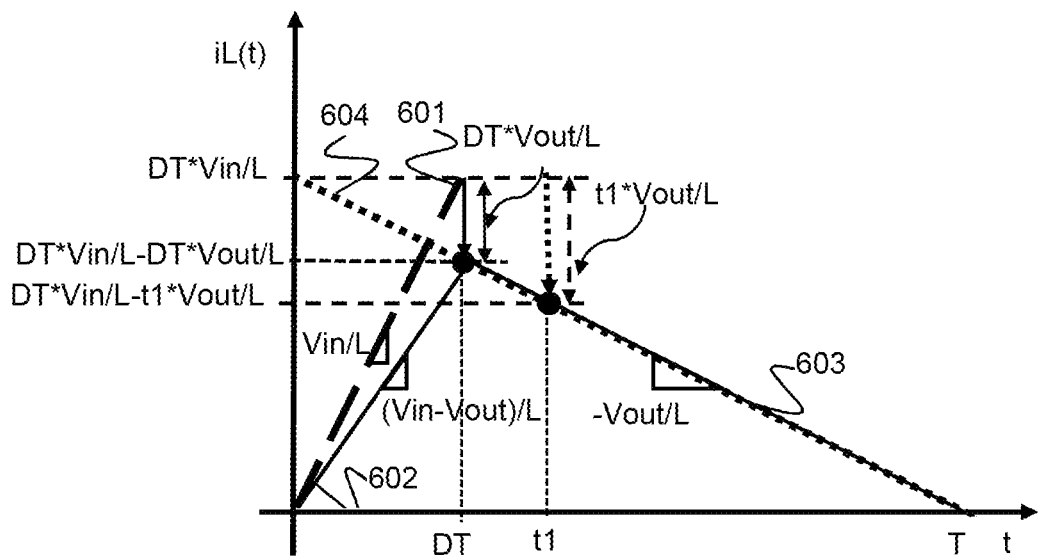
FIG. 6A is a line graph depicting generation of inductor current curve from voltage inputs and outputs during operation of the power device according to aspects of the present disclosure.

FIG. 6A is a line graph depicting generation of the inductor current curve from voltage inputs and outputs during operation of the power device according to aspects of the present disclosure. The peak current through the inductor at a given time point between the peak at time DT and the valley at time T can be determined from two separate variables Vin and Vout. Here, the current through the inductor rises consistently in proportion to the slope of voltage across the inductor Vin/L as indicated by line 601. The falling curve −Vout/L representing the output from the inductor may be subtracted from Vin/L to provide the actual current curve 602 of the inductor having the slope (Vin-Vout)/L. The peak of the inductor current iL(t) occurs at time point DT. As discussed previously, the inductor current is sensed from sampling the voltage across the low side switch at a time point t1 which is after DT and at a time sufficient to reduce or eliminate switching noise. Since the inductor current iL(t) sampling values at DT and t1 are DT*VIN/L-DT*VOUT/L and DT*VIN/L-t1*VOUT/L, respectively, the inductor current sampling value at t1 has the same inductor current rising slope value information for DT, DT*Vin/L, as the sampling value at t1. Therefore, since the sampling at t1 can represent the inductor current rising slope information and replaces DT. That is, the sampling results at t1 and T shows the same result as the sampling result at DT and T. Regression 604 of the line 603 representing the falling current from t1 to T shows that the value DT*Vout/L is accurately reconstructed. Thus, in the period Dt≤t≤T the slope of the rising inductor current iL(t) line 602 can be monitored using samples taken at t1 and T and the Vin and Vout values as iL(t) always has the value when rising to points DT and t1.

Figure 6B:
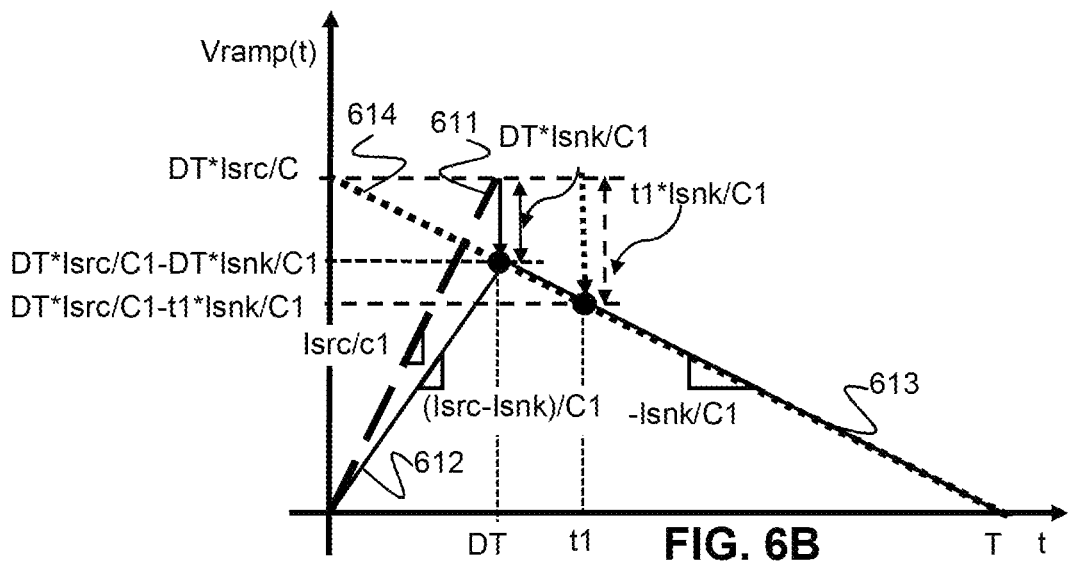
FIG. 6B is a line graph depicting the artificial ramp curve generated by an artificial ramp signal generator circuit to replicate the shape of the inductor current according to aspects of the present disclosure.

FIG. 6B is a line graph depicting the artificial ramp curve generated by the artificial ramp signal generator circuit 330 to replicate the shape of the inductor current according to aspects of the present disclosure. Here the artificial ramp curve is generated by the artificial ramp generation circuit shown in FIG. 6C according to aspects of the present disclosure. As shown, the ramp generation circuit 330 includes two variable DC current sources Isrc(i) and Isnk(i), a Pulse width modulated signal-controlled switch PWM, reset signal triggered switch rst(T) and capacitor C1. The circuit generates output signal vramp(t) described by FIG. 6B. Isrc(i) is arranged in series with Isnk(i) separated by PWM. Isnk(i) is configured to pull current from Isrc(i). In parallel with the Isnk(i) is a capacitor C1, which may be quickly discharged by the reset switch rst(T) and a reference voltage signal vref. The reference voltage signal, vref ensures that vramp(t) operates with the correct polarity. As will be discussed in a later section, Isrc(i) and Isnk(i) may receive a feedback signal (not shown here) used to adjust their outputs. An insight of the present disclosure is that components of the artificial ramp generation circuit 330 may be considered analogous to components that influence the shape of the inductor current curve. The variable DC current source Isrc(i) is analogous to the Vin, Isnk(i) is analogous to Vout and the capacitor C1 is analogous to the inductor L. Thus, through modification of these analogous components the output signal vramp(t) may be customized to fit the inductor current curve iL(t).

Turning back to FIG. 6B the relationship between the triangular form of vramp(t) and the inductor current iL(t) is apparent. As shown the capacitor C1 is charged as indicated by dashed line 611 with a slope of Isrc/C1 and reaches a maximum charged level at time point DT. A second component −Isnk/C1 contributes to the real capacitor charging curve 612 to produce a slope of (Isrc-Isnk)/C1. The slope of the discharge curve 613 generated by the circuit when the PWM switch turns off and capacitor is discharging is described by −Isnk/C1. Similar to the curve of the inductor current iL(t) a regression from time point t1 may be used to determine the charge of the capacitor at time point DT. Thus, the vramp may be used as to approximate iL(t).

To regulate IL(t) using the artificial ramp signal vramp, vramp must first be regulated to fit iL(t). The output signal vramp is regulated such that vsen(t)=vramp through two closed regulation loops during the period Dt≤t≤T. The regulation loops are:

$$\frac{Vin}{L} * R_A = \frac{Isrc(i)}{C1} \quad \text{Eq. 3}$$

$$\frac{Vout}{L} * R_A = \frac{Isnk(i)}{C1} \quad \text{Eq. 4}$$

In Eq. 3 and Eq. 4 $R_A$ is a conversion factor for sensing the inductor current from the voltage of the low side switch vsen(t). The conversion is provided by the equation:

$$vsen(t) = iL(t) * \frac{Rdson}{Rsen} * Rgain = iL(t) * R_A \quad \text{Eq. 5}$$

Thus, $$R_A = \frac{Rdson}{Rsen} * Rgain \quad \text{Eq. 6}$$

Where Rdson is the drain to source resistance when the low side MOSFET is in the "on" state, $v_{DS}$ (t) voltage information is changed into current information by a resistance Rsen through the input transconductance amplifier, which is part of the LS current sensing circuit 210. The resistance Rgain controls the gain of the transconductance amplifier to match the specific gain of IMON.

The artificial ramp curve, vramp may not match vsen and iL(t). To control the shape of vramp the Isrc(i) and Isnk(j) may be regulated in two closed loops according to the following equations:

$$Isrc(i) = Vin * \frac{C1}{L} * \frac{Rdson * Rgain}{Rsen} = Vin * Gm \quad \text{Eq. 7}$$

$$Isnk(i) = Vout * \frac{C1}{L} * \frac{Rdson * Rgain}{Rsen} = Vout * Gm \quad \text{Eq. 8}$$

Where Gm is the transconductance gain given by:

$$Gm = \frac{C1}{L} * \frac{Rdson * Rgain}{Rsen} \quad \text{Eq. 9}$$

Figure 7:
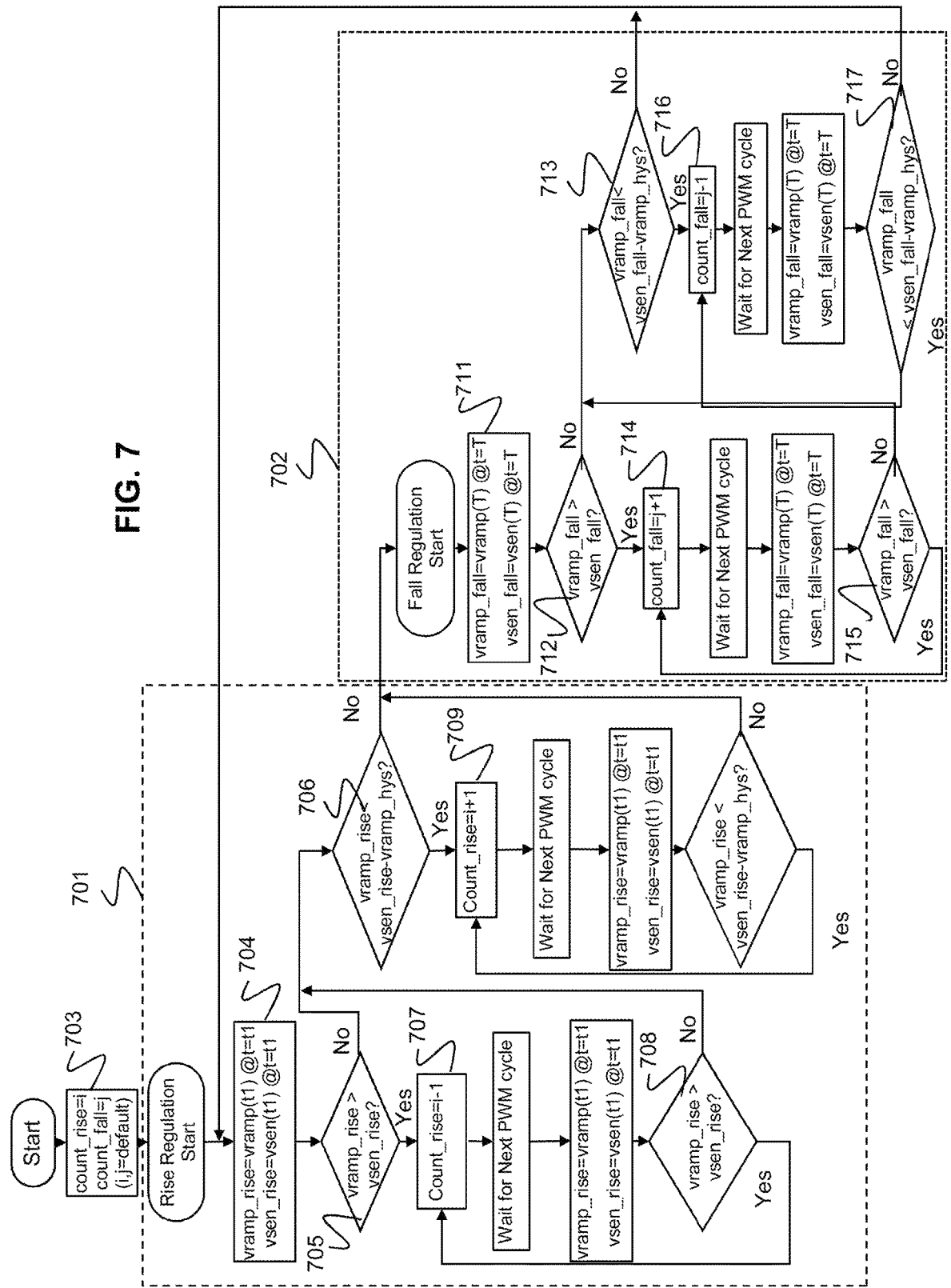
FIG. 7 is a flow diagram showing an implementation of two closed regulation loops used by a closed loop artificial ramp generator for matching an inductor current (iL(t)) curve according to aspects of the present disclosure.

FIG. 7 is a flow diagram showing an implementation of the two closed regulation loops used by the closed loop artificial ramp generator for matching the iL(t) curve according to aspects of the present disclosure. The closed loop artificial ramp generator utilizes two closed regulation loops to approximate iL(t). In the implementation shown the first closed loop 701 adjusts the rising portion of the artificial ramp signal (vramp_rise) and the second closed loop 702 adjusts the falling portion of the of artificial ramp signal (vramp_fall). In an alternative implementation the first closed loop may adjust vramp_fall and the second closed loop may adjust vramp_rise. The order in which the closed loops are implemented does not affect the accuracy of the artificial ramp signal's final approximation of iL(t). Looking at the closed loops in more detailed after the Start, the values of a counter for the rise portion are set to the default value of i and the counter for the fall portion to the default value of j at block 703. The vramp_rise value is then sampled and held to the value of vramp(t1) at time t1 and value of vsen_rise is then sampled and held to vsen(t1) at t1 at block 704. The value of vramp_rise and Vsen_rise is then compared at block 705; if vramp_rise is not greater than vsen_rise the process proceeds to block 706. If the value of vramp_rise is greater than vsen_rise, then the rise counter is decremented at block 707. After decrementing the rise counter, the system waits for the next PWM cycle. In the next PWM cycle vramp_rise value is then sampled and held to the value of vramp(t1) at time t1 and value of vsen_rise is then sampled and held to equal vsen(t1) at t1 and the value of vramp_rise and vsen_rise is then compared at block 708. If the vramp_rise is greater than Vsen_rise the process repeats back to block 707. If vramp_rise is not greater than vsen_rise, the process proceeds to block 706.

Block 706 compares vramp_rise to vsen_rise reduced by hysteresis from the vramp signal (vramp_hys). If the vramp_rise is not less than vsen_rise-vramp_hys the processes proceeds to the fall regulating loop and block 711. If vramp_rise is less than vsen_rise-Vramp_hys then rise counter is incremented as shown at block 709. After incrementing the rise counter, the system waits for the next PWM cycle. In the next PWM cycle vramp_rise value is then sampled and held to the value of vramp(t1) at time t1 and value of vsen_rise is then sampled and held to vsen(t1) at t1 and vramp_rise is compared to vsen_rise-vramp_hys at block 710. If the vramp_rise is still less than vsen_rise-Vramp_hys the process repeats to block 709. If vramp_rise is not less than Vsen_rise-Vramp_hys then the process proceeds to fall regulation and block 711.

Initially Fall regulation sets the vramp_fall signal to be sampled and held to the vramp(T) signal at time point T and the Vsen_fall signal to be sampled and held to the Vsen(T) signal at time point T at block 711. vramp_fall is then compared to vsen_fall at block 712. If vramp_fall is not greater than vsen_fall, the process proceeds to block 713. If vramp_fall is greater than vsen_fall, then the fall counter is incremented as shown at block 714. After incrementing the fall counter, the system waits for the next PWM cycle. In the next PWM cycle the vramp_fall signal is sampled and held to the vramp(T) signal at time point T and the vsen_fall signal sampled and held to the Vsen(T) signal at time point T. vramp_fall is then compared to vsen_fall at block 715 and if vramp_fall is greater than vsen_fall then the process repeats to block 714. If vramp_fall is not greater than vsen_fall, then the process proceeds to block 713.

Block 713 compares vramp_fall to vsen_fall-vramp_hys and if vramp_fall is not less than to vsen_fall-vramp_hys then process repeats back to rise regulation starting at block 704. If Vramp_fall is less than vsen_fall-vramp_hys then the fall counter is decremented as shown in block 716. After decrementing the fall counter, the system waits for the next PWM cycle. In the next PWM cycle the vramp_fall signal is sampled and held to the vramp(T) signal at time point T and the vsen_fall signal is sampled and held to the vsen(T) signal at time point T. vramp_fall is then compared to vsen_fall-vramp_hys at block 717. If vramp_fall is less than vsen_fall-vramp_hys then the process repeats to block 716. If Vramp_fall is not less than Vsen_fall-Vramp_hys then the process begins again at rise regulation starting at block 704.

Figure 9:
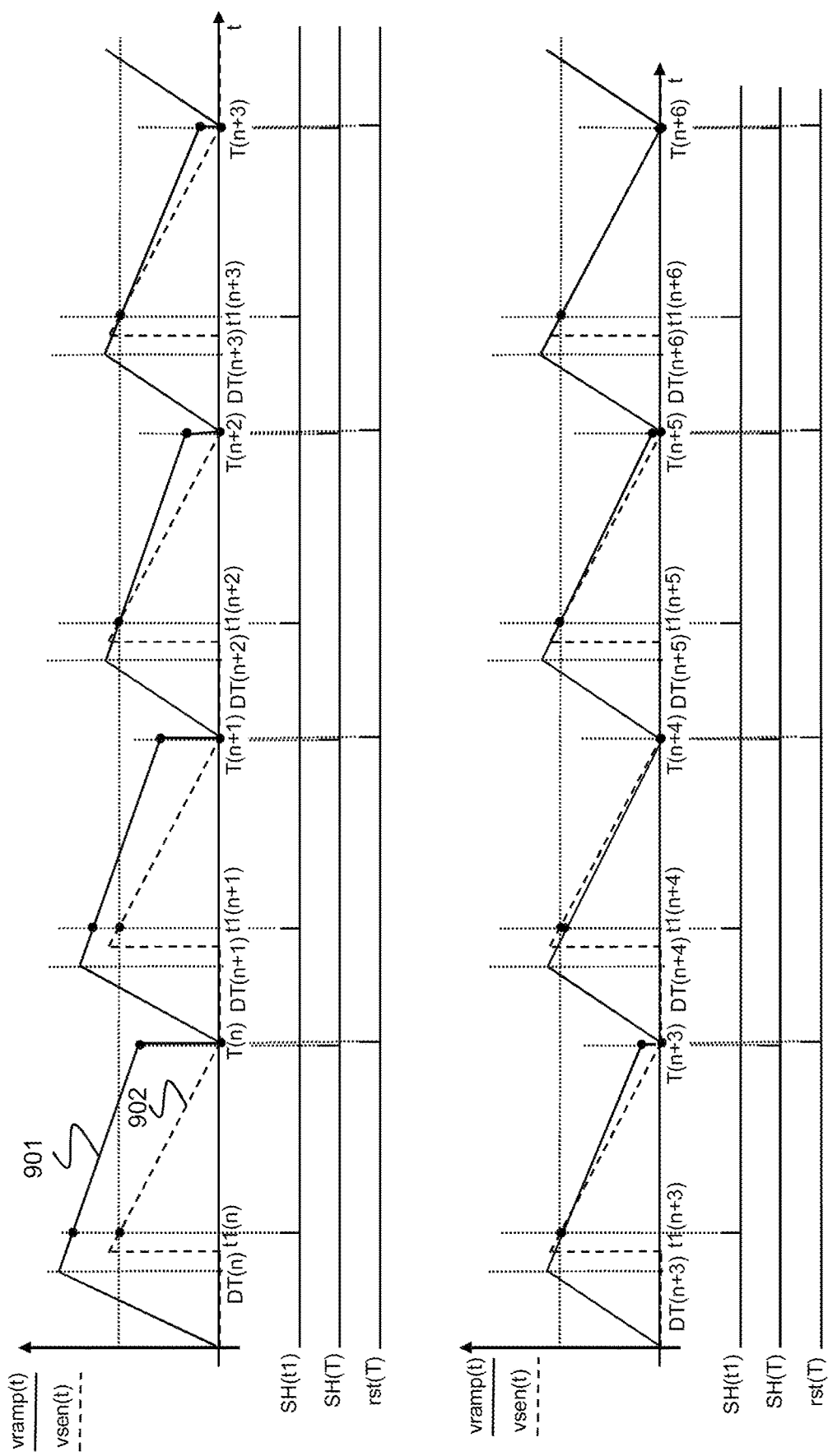
FIG. 9 is a line graph showing the effect of closed loop regulation on the artificial ramp signal, switching signals SH(t1) and SH(T), reset signal rst(T), and comparison to the sensed voltage according to aspects of the present disclosure.

FIG. 9 is a line graph showing the effect of the closed loop regulation on the artificial ramp signal, switching signals SH(t1) and SH(T), reset signal rst(T), and comparison to the sensed voltage according to aspects of the present disclosure. As shown the vramp signal 901 initially may be a poor approximation of vsen 902 and a poor approximation of iL(t) (not shown) as vsen approximates iL(t). After many cycles vramp approximately or exactly matches vsen as shown between time points T(n+5) and T(n+6). It can be seen from the graph that closed loop regulation may be configured to reduce the difference between a single set of sampling points (e.g., vramp(t1) and vsen(t1) or vramp(T) and vsen(T)) each cycle. For example and without limitation, in the between the cycle at period T(n−1) and T(n) and the cycle at time period T(n) and T(n+1) the closed loop regulation operates to change the peak level of vramp at DT(n+1) to reduce the difference between the sample at t1(n+1). The closed loop operation also has the effect of changing the valley level of vramp at T(n+1). In the illustrated example, at cycle n+2 the closed loop regulation matches or adequately approximates vramp to vsen and the regulation begins to change vramp to match vsen at time point T(n+3).

While in the example shown in FIG. 9 the vramp signal is regulated to match vsen within eight cycles, real world conditions may dictate how quickly and accurately the vramp signal may be changed to match Vsen. For example and without limitation, the speed at which vramp adequately approximates vsen may be influenced by the resolution of components of the artificial ramp generator such as the up down counter and the initial amount of error between the vramp signal and vsen.

Figure 8:
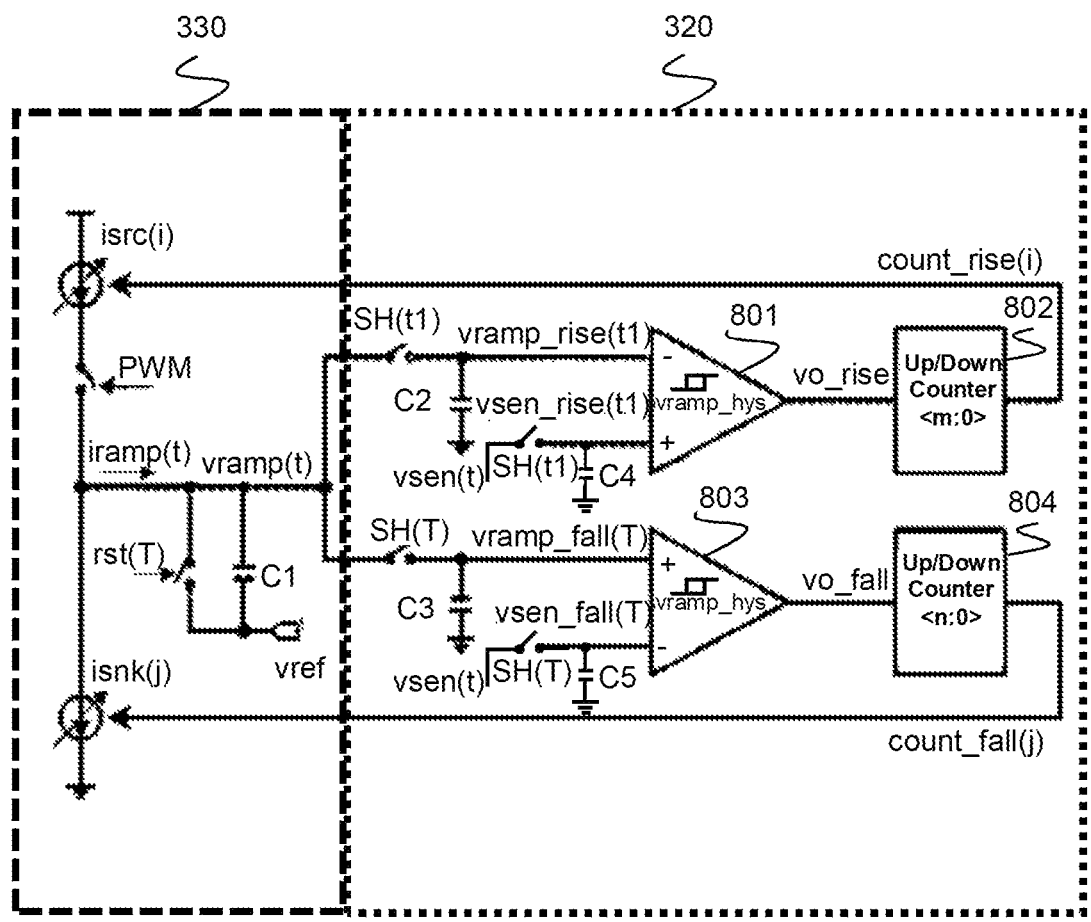
FIG. 8 is a circuit diagram for a closed loop artificial ramp signal generator according to aspects of the present disclosure.

FIG. 8 is a circuit diagram for a closed loop artificial ramp generator according to aspects of the present disclosure. As shown the closed loop artificial ramp includes an artificial ramp signal generator circuit portion 330 and a vramp/vsen sampling portion 320. The artificial ramp signal generator portion is a similar circuit to the one shown in FIG. 6C, but feedback used to adjust isrc(i) and isnk(j) is now shown. The function of the artificial ramp generation circuit is discussed with respect to FIGS. 6B and 6C as such the discussion here will be directed to the function and layout of vramp/vsen sampling portion 320. The vramp/vsen sampling portion 320 receives the artificial ramp signal vramp from the artificial ramp generation circuit 330. Two separate sampling circuits receive the Vramp signal. The first sampling circuit or rising signal circuit includes a signal activated, Sample-and-hold switch SH(t1) that is activated at sampling time point t1. A rising signal hysteresis comparator 801 is configured to receive the vramp signal from SH(t1) at the inverting input. Capacitors C2, C4 are arranged in parallel with the inverting and non-inverting inputs, respectively, of the rise hysteresis comparator 801 and act as data holding memories as well as passive filters to reduce transient spikes. The rising signal hysteresis comparator 801 only receives the signal Vramp_rise signal when SH(t1) is active. Additionally, the rising hysteresis comparator is configured to receive the signal vsen_rise(t1) at time point t1 at the non-inverting input by coupling vsen(t) when SH(t1) is active. A comparison is made between the signals vramp_rise(t1) and vsen_rise(t1). The hysteresis thresholds should be wider than the target resolution of vramp for the stability of the closed loop as well as to ensure that a noisy signal from vsen_rise or vramp_rise does not trigger the comparator multiple times. The rise up/down counter 802 is coupled to the hysteresis the output of the of the rise hysteresis comparator 801 and configured to receive the signal from the vo_rise signal from the rise hysteresis comparator 801 as an input. The rise up/down counter 802 increments or decrements the value of its output based on vo_rise. In combination with the rise hysteresis comparator 801 each time the value of vramp_rise (t1) transits above or below the value of vsen_rise(t1) and past a hysteresis threshold the output value count_rise(i) of the up/down counter changes and is latched till the next cycle. The target resolution of matching between vsen_rise (t1) and vramp_rise(t1) is achieved when the difference between vramp_rise(t1) and vsen_rise(t1) is less than the hysteresis level. The variable current source isrc(i) is coupled to the output of the rise up/down counter and receives count_rise(i) as an input. Isrc(i) may use count_rise (i) to control the output current level.

For example and without limitation, the rise sampling circuit with current source isrc(i) may function such that if vramp_rise(t1) rises above vsen_rise(t1) the value of the up/down counter may decrement thus decreasing count_rise controlling variable current source isrc(i) to reduce the source current, thus further decreasing the value of vramp_rise(t1) through the artificial ramp generation portion. When the vramp_rise(t1) falls below vsen_rise(t1) the counter may increment causing the value of counter_rise(i) to increase, which in turn controls isrc(i) to increase the current and thus causing an increase in vramp_rise(t1) through the artificial ramp generator circuit.

The second sampling circuit or falling signal circuit controls the falling signal value count_fall(j) which is used to control the variable DC current source isnk(j). The function and layout of the falling signal circuit is similar to that of the first sampling circuit. The second sampling circuit includes a signal activated switch SH(T) that is activated at sampling time point T. The falling signal hysteresis comparator 803 is configured to receive the vramp(t) signal from SH(T) at the non-inverting input. Capacitors C3, C5 are arranged in parallel with the non-inverting and inverting inputs respectively, of the falling hysteresis comparator 803 and act as data holding memories as well as passive filters to reduce transient spikes. The falling signal hysteresis comparator 803 only receives the signal vramp_fall signal when SH(T) is active. Additionally, the falling hysteresis comparator is configured to receive the signal vsen_fall(T) at time point T at the inverting input by coupling vsen(t) when SH(T) is active. A comparison is made between the signals vramp_fall(T) and vsen_fall(T). The hysteresis level of comparator 803 should be wider than the target resolution of vramp for the stability of the closed loop as well as to ensure that a noisy signal from vsen_fall(T) or vramp_fall (T) does not trigger the comparator unstably. The falling up/down counter 804 is coupled to the hysteresis the output of the of the falling hysteresis comparator 803 and configured to receive the signal from the vo_fall signal from the falling hysteresis comparator 803 as an input. The falling up/down counter 804 increments or decrements value based on vo_fall. In combination with the falling hysteresis comparator 803 each time the value of vramp_fall(T) transits above or below the value of vsen_fall(T) and past a hysteresis level the output value count_fall(j) of the falling up/down counter is latched. The target resolution of matching between vsen_fall(T) and vramp_fall(T) is achieved when the difference between vramp_fall(T) and vsen_fall(T) is less than the hysteresis level. The variable current source isnk(j) is coupled to the output of the falling up/down counter and receives count_fall(j) as an input. isnk(j) may use count_fall(j) to control the output current level.

For example and without limitation, the fall sampling circuit with isnk(j) may function such that if vramp_fall(T) rises above vsen_fall(T) the value of the up/down counter may increment thus increasing count_fall controlling variable current source isnk(j) to increase the amount of current pulled from the artificial ramp generator, thus increasing discharge slope of capacitor C1 and the value of vramp_fall (T) through the artificial ramp generation portion. When the vramp_fall(T) falls below vsen_fall(T) the counter may decrement causing the value of count_fall(j) to decrease, which in turn controls variable current source isnk(j) to decrease the current pulled from the artificial ramp generator circuit and thus causing a decrease in discharge of capacitor C1 and vramp_fall(T) through the artificial ramp generator circuit.

Figure 6C:
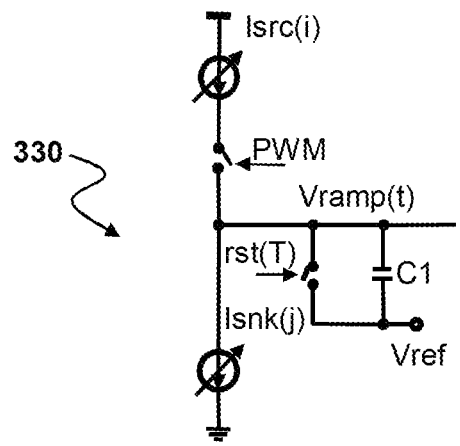
FIG. 6C is a circuit diagram showing an artificial ramp signal generator circuit according to aspects of the present disclosure.

Turning back to FIG. 9 the activation of the different signals, SH(t1), SH(T) and rst(T) can be seen as well as their effect on the artificial ramp circuit. The signal SH(t1) controls the switch for sampling the rising signal and activates at time point t1. The signal SH(T) controls the switch for sampling the falling signal and activates at time point T. The signal rst(T) is generated by a reset switch that activates at the end of a cycle and functionally resets the artificial ramp circuit. In FIGS. 6C and 8, rst(T) controls a switch which equalizes the charge in capacitor C1, eliminating any current that may be stored within C1.

The closed loop artificial ramp generator according to aspects of the present disclosure provides an improved inductor current sensing device. Hysteresis built into to the comparators (801, 803) with thresholds chosen to be wider than the target resolution for stability of the closed loop and sampling time points chosen to reduce switching noise provides the device with protection from transient voltage spikes due to switching which may degrade accuracy. The addition of feedback from previous artificial ramp signal cycles provides the improved device with further robustness allowing the device to correct ramp signal deviation and further minimize output error.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A," or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A Switch Mode Power Supply (SMPS) system, comprising:
   a SMPS, comprising a high-side (HS) switch and a low-side (LS) switch coupled in series and an output filter including an inductor and a capacitor coupled to a switch node formed by the HS and LS switches, wherein an inductor current is supplied by the inductor to a load; and
   an inductor current sensing device coupled across the LS switch, the inductor current sensing device having a first input configured to receive a node signal indicating a voltage level at the switch node, wherein the inductor current sensing device is configured to sample the node signal indicating the voltage at the switch node at a first time point to generate a first sampled node voltage and sample the node signal indicating the voltage at the switch node at a second time point after the first time point to generate a second sampled node voltage wherein the first sampled node voltage is greater than the second sampled node voltage,
   wherein the inductor current sensing device is further configured to generate an artificial ramp signal and adjust the artificial ramp signal in a dual closed loop configuration based on the first sampled node voltage or second sampled node voltage to generate an output ramp signal wherein the output ramp signal has a triangular waveform including a rising slope that is proportional to a rising slope of the inductor current and a falling slope proportional to a falling slope of the inductor current, wherein the inductor current sensing device is configured to adjust the artificial ramp signal by sampling the artificial ramp signal at the first time point and the second time point and comparing the value of the artificial ramp signal at the first time point to the first sampled node voltage and changing a peak level of the artificial ramp signal based on the comparison.

2. The system of claim 1, wherein the dual closed loop configuration includes a first closed loop that regulates the rising slope of the output ramp signal related to a rising slope of an inductor current signal and a second closed loop that regulates the falling slope of the output ramp related to the falling slope of the inductor current signal.

3. The SMPS system of claim 2 the inductor current sensing device is further configured to compare the second sampled node voltage to the value of the artificial ramp signal at the second time voltage and adjusting a valley level of the artificial ramp signal based on the comparison.

4. The system of claim 1 wherein the inductor current sensing device further includes:
   a sampling circuit configured to receive the node signal, wherein the sampling circuit is further configured to latch the node signal level indicating the voltage level at the first time point and second time point, wherein the sampling circuit is further configured to generate the first sampled node voltage from the latched node signal at the first time point and the second sampled node voltage from the latched node signal at the second time point;
   an artificial ramp signal generating circuit having a first input configured to receive the first sampled node voltage and having a second input configured to receive the second sampled node voltage wherein the artificial ramp signal generating circuit is further configured to generate the artificial ramp signal and adjust the artificial ramp signal based on the first sampled node voltage and the second sampled node voltage.

5. The system of claim 4 wherein the sampling circuit is further configured to receive the artificial ramp signal from the artificial ramp signal generating circuit and latch an artificial ramp signal level at the first time point and latch and artificial ramp signal at the second time point, wherein the sampling circuit is additionally configured to generate a first sampled ramp signal from the latched artificial ramp signal level and generate a second sampled ramp signal from the latched second artificial ramp signal, wherein the first artificial ramp signal is greater than the second artificial ramp signal.

6. The system of claim 5 wherein the artificial ramp signal generator includes a third input configured to receive the first sampled ramp signal and fourth input configured to receive the second sampled ramp signal, wherein the artificial ramp signal generator is further configured to refine the artificial ramp signal based on the first sampled node voltage, second sampled node voltage, first sampled artificial ramp signal, and third sampled artificial ramp signal.

7. The system of claim 5 further comprising a multiplexer having a first input configured to receive the output ramp signal and a second input configured to receive the node signal and a third input configured to receive an output selection signal wherein the multiplexer is configured to output either the output ramp signal or the node signal depending upon the output selection signal.

8. An inductor current sensing device for detecting an inductor current in a Switch Mode Power Supply (SMPS), wherein the SMPS has a high-side (HS) switch and a low-side (LS) switch coupled in series and an output filter including an inductor and a capacitor coupled to a switch node formed by the HS and LS switches, wherein the inductor current is supplied by the inductor to a load, the inductor current sensing device comprising;
  a sampling circuit coupled across the LS switch having a first input configured to receive a node signal indicating a voltage level at the switch node, wherein the sampling circuit is configured to latch the node signal level indicating the voltage level at a first time point and a second time point, wherein the sampling circuit is further configured to generate a first sampled node voltage from the node signal latched at the first time point and a second sampled node voltage from the node signal latched at the second time point;
  an artificial ramp signal generating circuit having a first input configured to receive the first sampled node voltage and having a second input configured to receive the second sampled node voltage wherein the artificial ramp signal generating circuit is further configured to generate an artificial ramp signal and adjust the artificial ramp signal in a dual closed loop configuration based on the first sampled node voltage or the second sampled node voltage to generate an output ramp signal wherein the output ramp signal has a triangular waveform including a rising slope that is proportional to a rising slope of the inductor current and a falling slope proportional to a falling slope of the inductor current, wherein the sampling circuit is further configured to receive the artificial ramp signal from the artificial ramp signal generating circuit and latch an artificial ramp signal level at the first time point and latch and artificial ramp signal at the second time point, wherein the sampling circuit is additionally configured to generate a first sampled ramp signal from the latched artificial ramp signal level and generate a second sampled ramp signal from the latched second artificial ramp signal, wherein the first artificial ramp signal is greater than the second artificial ramp signal.

9. The device of claim 8, wherein the dual closed loop configuration includes a first closed loop that regulates the rising slope of the output ramp signal related to a rising slope of an inductor current signal and a second closed loop that regulates the falling slope of the output ramp signal related to a falling slope of the inductor current signal.

10. The device of claim 8 wherein the artificial ramp signal generator includes a third input configured to receive the first sampled ramp signal and fourth input configured to receive the second sampled ramp signal, wherein the artificial ramp signal generator is further configured to refine the artificial ramp signal based on the first sampled node voltage, second sampled node voltage, first sampled artificial ramp signal, and third sampled artificial ramp signal.

11. The device of claim 8 further comprising a multiplexer having a first input configured to receive the output ramp signal and a second input configured to receive the node signal and a third input configured to receive an output selection signal wherein the multiplexer is configured to output either the output ramp signal or the node signal depending upon the output selection signal.

12. The device of claim 8 wherein the artificial ramp generator is configured to adjust the artificial ramp signal by comparing the first sampled artificial ramp signal with the first sampled node voltage and changing a peak level of the artificial ramp signal based on the comparison.

13. The device of claim 12 wherein the artificial ramp generator is further configured to compare the second sampled node voltage to second artificial ramp signal and adjust a valley level of the artificial ramp signal based on the comparison.

14. A method for sensing an inductor current in a Switch Mode Power Supply (SMPS), wherein the SMPS has a high-side (HS) switch and a low-side (LS) switch coupled in series and an output filter including an inductor and a capacitor coupled to a switch node formed by the HS and LS switches, wherein the inductor current is supplied by the inductor to a load, the method comprising:
  sampling an input node signal indicating a voltage level at the switch node at a first time point to generate a first sampled node voltage;
  sampling the input node signal indicating the voltage level at the switch node at a second time point;
  generating an artificial ramp signal; and
  adjusting the artificial ramp signal in a closed loop based on the first sampled node voltage or the second sampled node voltage to generate an output ramp signal wherein the output ramp signal has a triangular wave form including a rising slope that is proportional to a rising slope of the inductor current and a falling slope proportional to a falling slope of the inductor current
  sampling the artificial ramp signal at the first time point to generate a first sampled artificial ramp signal and sampling the artificial ramp signal at the second time point to generate a second sampled artificial ramp signal.

15. The method of claim 14 wherein adjusting the ramp signal includes comparing the first sampled artificial ramp signal with the first sampled node voltage and changing a peak level of the artificial ramp signal based on the comparison.

16. The method of claim 14 wherein adjusting the ramp signal includes comparing the second sampled node voltage to second artificial ramp signal and adjusting a valley level of the artificial ramp signal based on the comparison.

17. The method of claim 14 wherein adjusting the artificial ramp signal includes a first closed regulation loop configured to adjust a peak level of the artificial ramp signal and second closed regulation loop configured to adjust a valley level of the artificial ramp signal wherein the first closed regulation loop and second closed regulation loop are configured to operate on separate cycles.

18. The method of claim 17 wherein the first closed regulation loop uses the first sampled artificial ramp signal and the first sampled node voltage from a first cycle to adjust the closed peak level of the artificial ramp signal.

19. The method of claim 18 wherein the second closed regulation loop uses the second sampled artificial ramp signal and the second sampled node voltage from a second cycle to adjust the valley level of the artificial ramp signal.

20. The method of claim 17 wherein the second closed regulation loop begins adjusting the valley level a cycle after the first closed regulation loop reaches a target resolution.

21. The method of claim 15 wherein the first closed regulation loop begins adjusting the peak level a cycle after the second closed regulation loop reaches a target resolution.

\* \* \* \* \*